(No Model.)
J. K. SAX.
CAR WHEEL.
No. 249,102.　　　　　　　　　Patented Nov. 1, 1881.
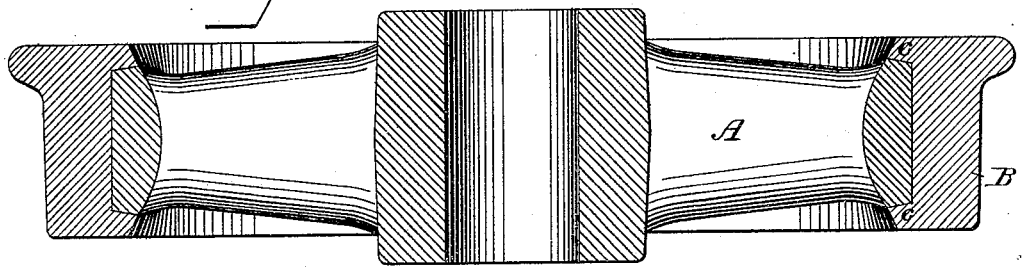
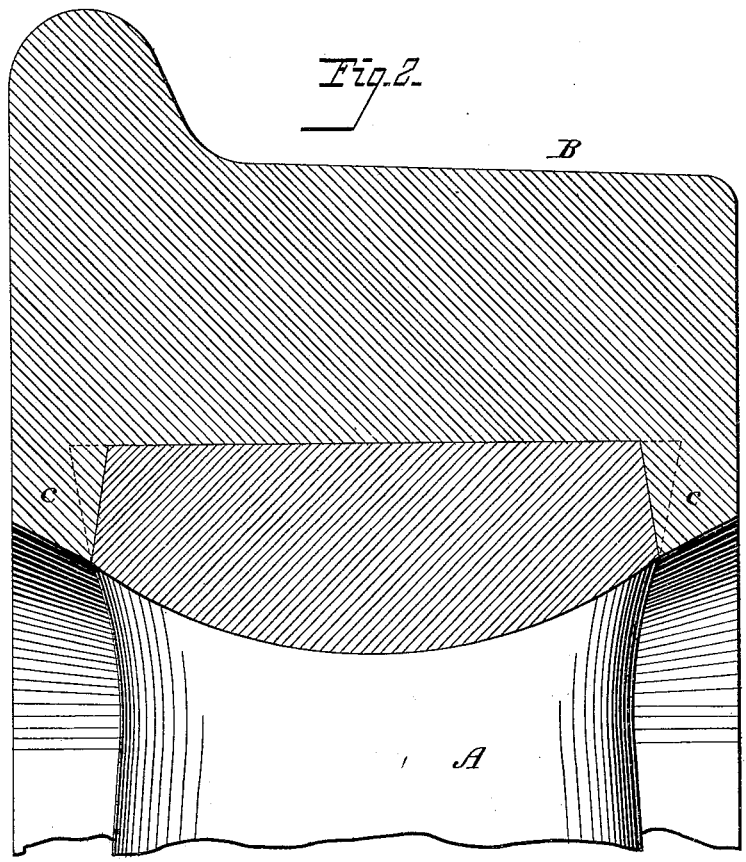
Attest:
Courtney A. Cooper
William Paxton
J. K. Sax
By his attorney
Charles E. Foster

UNITED STATES PATENT OFFICE.

JOHN K. SAX, OF HIGH BRIDGE, NEW JERSEY.

CAR-WHEEL.

SPECIFICATION forming part of Letters Patent No. 249,102, dated November 1, 1881.

Application filed June 27, 1881. (No model.)

*To all whom it may concern:*

Be it known that I, JOHN K. SAX, of High Bridge, Hunterdon county, New Jersey, have invented certain Improvements in the Manufacture of Car-Wheels, of which the following is the specification.

The objects of my invention are to make a car-wheel in which a previously-formed rim, tire, or re-enforce of suitable metal shall be firmly united to a cast-metal body, and to effect the union of the two in an economical manner. These objects I attain by constructing the wheel as hereinafter described, and shown in the accompanying drawings.
In the drawings, Figure 1 is a section of a spoke-wheel, showing my invention; Fig. 2, a section of the rim, full size.

The cast-metal body A of the wheel may be of any of the usual forms, having spokes, web, or plates, as may be desired.

The tire, tread, or rim B, which may either be cast to full size and shape of steel or other metal or hammered or rolled, if preferred, is formed with two side flanges or lips, $c$ $c$, projecting from its inner surface, the inner sides of the flanges being parallel or flaring outward, as shown in Fig. 1, or inward, as in dotted lines, Fig. 2, so as to form a dovetailed annular recess to receive the periphery of the body.
In the manufacture of the wheel I first make the tire or rim and then prepare the mold in which to cast the body of the wheel, said mold or matrix being provided within its outer circumference with an annular space to receive the tire, which is then sufficiently heated, and is immediately placed within the mold in the space intended for its reception. The mold is then closed and the molten metal poured into it to form the body of the wheel. By this operation the highly-heated molten metal is cast against and comes in direct contact with the inner surface of the highly-heated previously-formed rim, causing an intimate welding, fusing to, and union of the rim and the body of the wheel at the respective surfaces in contact.

As in the above process of manufacture the entire wheel is highly heated, (sufficiently to fuse the body of the wheel to the tire,) all parts of the wheel cool together, preventing any local chilling of the metal and the creation of tension at any part from unequal contraction.

The wheels produced are of a superior quality, not only from the effective union of the tire and the cast-iron body, but also from the position of the flanges $c$, affording a wide bearing at each side, resisting any thrust tending to laterally displace the rim, and imparting greater strength to the periphery of the cast-metal portion of the wheel.

This construction admits of the tire being more closely worn down than in wheels of ordinary forms, thus effecting a greater saving in the amount of steel or other metal required to secure a given amount of service on the rail.

I claim—

1. A car-wheel consisting of a flanged rim having a recess at the inner side and a metal body fused or welded to the said rim, substantially as set forth.

2. The combination, in a wheel, of the hammered or rolled metal rim having inward projecting side flanges and a cast-metal body fused to said rim, as specified.

In testimony whereof I have signed my name to this specification in the presence of two subscribing witnesses.

JOHN K. SAX.

Witnesses:
J. T. DORLAND,
W. W. DORLAND.